US012223846B2

(12) United States Patent
Ortlieb et al.

(10) Patent No.: US 12,223,846 B2
(45) Date of Patent: Feb. 11, 2025

(54) METHOD FOR PLANNING THE OPERATION OF AN AERIAL VEHICLE, CONTROL UNIT FOR AN AERIAL VEHICLE AND AERIAL VEHICLE WITH SUCH A CONTROL UNIT

(71) Applicant: Volocopter GmbH, Bruchsal (DE)

(72) Inventors: Markus Ortlieb, Karlsruhe (DE); Florian-Michael Adolf, Frankfurt am Main (DE)

(73) Assignee: Volocopter GmbH, Bruchsal (DE)

( * ) Notice: Subject to any disclaimer, the term of this patent is extended or adjusted under 35 U.S.C. 154(b) by 327 days.

(21) Appl. No.: 17/699,246

(22) Filed: Mar. 21, 2022

(65) Prior Publication Data

US 2022/0301446 A1 Sep. 22, 2022

(30) Foreign Application Priority Data

Mar. 19, 2021 (DE) ......................... 102021106868.1

(51) Int. Cl.
*G08G 5/00* (2006.01)
*G08G 5/04* (2006.01)

(52) U.S. Cl.
CPC ......... *G08G 5/0034* (2013.01); *G08G 5/0013* (2013.01); *G08G 5/0056* (2013.01); (Continued)

(58) Field of Classification Search
None
See application file for complete search history.

(56) References Cited

U.S. PATENT DOCUMENTS 6,134,500 A 10/2000 Tang et al.
6,334,334 B1 1/2002 Stockmann et al.
(Continued)

FOREIGN PATENT DOCUMENTS

CN 102622653 8/2012
CN 104165627 11/2014
(Continued)

OTHER PUBLICATIONS

Xiao Yuting et al., "Multi-UAV Coverage Path Planning Based on Chunked Optimisation Ideas", Science China: Technological Sciences, No. 1, vol. 50, No. 4, pp. 439-452, Apr. 7, 2020.

*Primary Examiner* — Donald J Wallace
*Assistant Examiner* — Samantha P. Pelow
(74) *Attorney, Agent, or Firm* — FIG. 1 Patents

(57) ABSTRACT

An all-inclusive method for planning the operation of an aerial vehicle, in particular an eVTOL, which operation is divided into different operational areas each with its own individually validatable and inspectable planning methodology, including (i) pre-processing data on a computer basis on the ground before takeoff of the aerial vehicle; (ii) taking along pre-planned results of the data pre-processing in the form of a database (33, 44) on board the aerial vehicle, preferably after transferring the pre-planned results into the database (33, 44) on board the aerial vehicle; (iii) combining the pre-planned results by means of a computer-based decision logic (28) with planning steps at the flying time in accordance with a state of the aerial vehicle recorded by sensors for generating a current flight path; and (iv) controlling the aerial vehicle along the current flight path.

20 Claims, 3 Drawing Sheets

(52) U.S. Cl.
CPC ........... *G08G 5/006* (2013.01); *G08G 5/0069* (2013.01); *G08G 5/045* (2013.01)

(56) References Cited

U.S. PATENT DOCUMENTS

| | | | | |
|---|---|---|---|---|
| 2014/0244077 | A1 | 8/2014 | Laso-Leon et al. | |
| 2016/0140851 | A1* | 5/2016 | Levy | G08G 5/0069 701/410 |
| 2017/0036771 | A1* | 2/2017 | Woodman | B64U 30/293 |
| 2020/0023973 | A1* | 1/2020 | Xu | B64D 1/18 |
| 2020/0391384 | A1* | 12/2020 | Cohen | G05D 1/0214 |
| 2021/0358310 | A1* | 11/2021 | Sachs | G08G 5/0039 |

FOREIGN PATENT DOCUMENTS

| | | | | |
|---|---|---|---|---|
| CN | 104991895 | | 10/2015 | |
| CN | 109074749 | A * | 12/2018 | G06F 3/0482 |
| CN | 110568862 | | 12/2019 | |
| CN | 111552310 | | 8/2020 | |
| CN | 111380526 | | 4/2022 | |
| DE | 102019103173 | | 8/2020 | |
| DE | 102020105793 | | 9/2021 | |
| EP | 1958176 | | 4/2009 | |
| EP | 3901859 | | 10/2021 | |
| FR | 2894367 | | 6/2007 | |
| JP | 2003130675 | | 5/2003 | |
| JP | 2019075075 | | 5/2019 | |
| JP | 2020009281 | | 1/2020 | |

* cited by examiner

METHOD FOR PLANNING THE OPERATION OF AN AERIAL VEHICLE, CONTROL UNIT FOR AN AERIAL VEHICLE AND AERIAL VEHICLE WITH SUCH A CONTROL UNIT

INCORPORATION BY REFERENCE

The following documents are incorporated herein by reference as if fully set forth: German Patent Application No. 10 2021 106 868.1, filed Mar. 19, 2021.

TECHNICAL FIELD

The invention relates to an all-inclusive method for planning the operation of an aerial vehicle, in particular an eVTOL, that is to say an electrically powered (preferably autonomous) vertical takeoff and landing aerial vehicle with a number of distributed drive units.

The invention also relates to a control unit for an aerial vehicle, preferably an eVTOL, in particular for operating and controlling the aerial vehicle by the method according to the invention.

The invention relates furthermore to an aerial vehicle, preferably an eVTOL, with a control unit according to the invention.

BACKGROUND

In the past, related work has been performed for partial aspects of the motion planning for aerial vehicles. Planning environments for the creation of comprehensively pre-planned, map-based missions in the military field have thus already been developed and approved (NASA). In this case, the safety of operational flight was ensured by virtue of emergency landing trajectories that were pre-planned at regular route intervals and that were able to be selected in real time during flight by a state machine on board the aerial vehicle. A state machine (also referred to as a finite state machine, FSM) is a model of a behavior, consisting of states, transitions between states and actions. A machine is known as finite if the set of states that it can assume is finite, and is a special case from the set of automatic machines.

Likewise map-based, Ground Collision Avoidance Systems (GCAS) were developed back in the 1990s, automatically preventing collisions with the terrain through targeted maneuvers (NASA, Airbus).

Path planning with pre-planned path sections was demonstrated for the first time by Emilio Frazzoli. Early work was restricted to so-called motion primitives with constant trimming states, which were later extended to more complex controller specifications. Initially pre-planned paths were followed by applications in which the path was generated during the flight by means of on-board maneuver libraries.

Approaches which divide the planning process into sequential and individually validatable planning phases have been developed by, among others, the Institut für Flugversuchstechnik des DLR Braunschweig (Institute for Flight Testing Technology of the German Aerospace Center, Braunschweig) (Florian-Michael Adolf et al.) and validated in flight testing.

Classic path planning approaches that are already known are usually designed for a dedicated application and therefore only have little flexibility and limited capabilities for adaptation to new circumstances. This applies in particular to deterministic approaches, such as are regularly used in safety-critical environments.

Optimization- or ML-(machine learning) based approaches can indeed close this flexibility gap, but do not have deterministic behavior, as required in the case of the application of interest here (aviation). Inspectability likewise suffers, or can only be obtained with great effort and even then only to a restricted extent.

Requirements of the aviation authorities for automated flights over inhabited areas therefore cannot be met by the existing methods. There is therefore a need for path planning approaches for applications in highly regulated areas with high safety requirements or in environments with high operational risk.

SUMMARY

The invention is based on the object of providing an all-inclusive method that can be used for the safe and efficient operation (path planning and control) of an aerial vehicle, specifically an eVTOL, even in highly regulated areas with high safety requirements or in environments with high operational risk.

The object is achieved by a method with one or more of the features disclosed herein, by a control unit with one or more of the features disclosed herein, and well as by an aerial vehicle with one or more of the features disclosed herein.

Advantageous developments are described below and in the claims.

An all-inclusive method according to the invention for planning the operation of an aerial vehicle, in particular an eVTOL, which operation is divided into different operational areas each with its own planning methodology, which planning methodologies are individually validatable and inspectable, comprises:

- pre-processing data on a computer basis on the ground before takeoff of the aerial vehicle;
- taking along pre-planned results of the data pre-processing in the form of a database on board the aerial vehicle, preferably after transferring the pre-planned results into the database on board the aerial vehicle;
- combining the pre-planned results by means of a computer-based decision logic with planning steps at the flying time in accordance with a state of the aerial vehicle recorded by sensors for generating a current flight path; and
- controlling the aerial vehicle along the current flight path.

The validatability or inspectability mentioned is preferably achieved by using deterministic planning methods, but especially by preplanning (the aforementioned data pre-processing), which allows validation of all flight paths before departure. The use of dedicated planners (i.e. planning methodologies) for different flight phases also allows these to be validated independently of the global planning solution.

The term "on the ground" includes in particular every kind of data pre-processing that takes place "off-line". Off-line means that the data pre-processing is performed before the flight (before takeoff). The latter may take place both "off-board" and "on-board". The phrase "on the ground" includes both possibilities. On the other hand, on-line means in this context that data processing is performed on board the aerial vehicle and during the flight.

The term "recorded by sensors" explicitly also includes an estimation of the state. This is based on states recorded by sensors. Correspondingly, an estimation of the state fuses a number of measured values into a state solution. Therefore, in the present connection, the terms should be understood as synonyms.

A control unit according to the invention for an aerial vehicle, preferably an eVTOL, in particular for operating and controlling the aerial vehicle by a method according to the invention, which operation is divided into different operational areas each with its own planning methodology, which planning methodologies are individually validatable and inspectable, comprises:

a computer-based data pre-processing unit, which is present on the ground and/or on board the aerial vehicle;

a database, which is taken along on board the aerial vehicle and in which pre-planned results of the data pre-processing unit are stored;

a computer-based decision logic on board the aerial vehicle, which is designed and configured for combining the pre-planned results from the database by means of a decision logic and also for carrying out additional planning steps at the flying time in accordance with a measured state of the aerial vehicle and for generating a current flight path; and a controller in operative connection with the decision logic for controlling the aerial vehicle along the current flight path.

An aerial vehicle according to the invention comprises a control unit according to the invention.

On the basis of the preplanning provided according to the invention, which can be validated before departure, the aerial vehicle can also be operated in highly regulated areas with high safety requirements or in environments with high operational risk. On the basis of the intended planning steps at the flying time (i.e. in real time) in accordance with a state of the aerial vehicle recorded by sensors for generating a current flight path, which represents verified planning at the flying time (=on-line planning in precalculated convex spaces), it is possible to reduce the storage requirement of the preplanning without sacrificing handling options.

The proposed method or the associated architecture of the control unit preferably combines a number of planning approaches specifically designed for different operational areas into an all-inclusive planning approach, which covers the entire operational envelope (flight envelope; representation of the admissible physical operating parameters) of the aerial vehicle, using information known in advance by way of the planning environment, as far as possible with deterministic properties. The intended preplanning allows the on-line phase to be reduced to a search problem. As a result, the on-line phase is, by definition, deterministic within the framework of this search problem. By calculating their handling options in advance, deterministic properties are preferably likewise imparted to additional on-line planning algorithms. The on-line planning is thus reduced to a deterministic combination of so-called motion primitives precalculated in sections. Planning steps of each planning methodology specific to an operational area are designed such that they become individually validatable and inspectable, whereby a high level of transparency of the planning process is achieved. This can be achieved by the separation into off-line planning and on-line selection of the best trajectory. The feasibility and safety of the planned paths, including all so-called “target safety levels”, can be validated before departure. The number and complexity of the planning steps to be performed on board the aerial vehicle and at the flying time is minimized by extensive data pre-processing on the ground. Pre-planned results are taken along on board in the form of a database and are combined by a decision logic with planning steps at the flying time in accordance with the state of the aerial vehicle, which state is or can be recorded by sensors.

The approach described here represents a safe solution for the flight guidance of highly automated flying systems (aerial vehicles) in environments with high safety requirements. In this respect, two principles are advantageously followed:

1. Reducing the computing tasks required at the flying time by extensive pre-processing/preparation of available data records and preplanning of a set that is as complete as possible of all flight paths relevant during the mission.

2. Covering all relevant operational states by planning methodologies specifically designed for the respective operational state and flight phase.

Corresponding developments of the method according to the invention therefore provide that the pre-processing comprises preparation of available data records and preplanning of a set that is as complete as possible of all flight paths relevant during operation, specifically during a mission (that is to say a specific flight), and that planning methodologies specifically designed for the respective operational state and a flight phase are used for all relevant operational states of the aerial vehicle. The data records referred to may comprise, without restriction, digital terrain models, technical data of the aerial vehicle, sets of regulatory rules, traffic data, population distribution, airspace maps, land development plans, land-use maps, static evaluation of flight movements in the flying area, etc.

There is correspondingly no single overall planner (or planning algorithm) for the problem, but instead the overall problem of the flight path determination is divided into many sub-problems, which are solved individually (by means of the planning methodology specifically designed for the respective flight phase) and subsequently put together to form an overall solution. As a result, not only is the size of each problem to be solved reduced, but also the scale of the overall problem is restricted to the essential components. Examples here are separate instances of planning for the direct vicinity of a vertiport, the landing approach and for contingencies (unplanned events).

If the planning environment is already known before the request for a specific flight connection (for example delivery service in a specific city), it is possible within the framework of a development of the method according to the invention, in particular according to the process described in the application EP 20170891.4 originating from the applicant, to generate extensive risk models and make them available to the mission planning system in addition to geographical maps, surface models and other environmental data records.

A corresponding configuration of the method according to the invention therefore provides that, in the case of a planning environment that is already known before the planning or request for a specific flight connection (for example for a delivery service in a specific city), initially risk models are generated and made available for the planning in addition to geographical maps, surface models and other environmental data records, as described in European patent application EP 20170891.4 of Apr. 22, 2020, which is incorporated herein by reference as if fully set forth.

Similarly, on the basis of knowledge of the physical flying properties of the aerial vehicle, flight paths and so-called maneuvers, i.e. smaller pieces of the trajectory, such as evasive maneuvers, ascending and descending flights, etc., that can be used in the later course of planning can preferably be calculated in advance.

A corresponding configuration of the method according to the invention therefore provides that, on the basis of knowledge of physical flying properties of the aerial vehicle, flight paths and maneuvers that can be used for the later planning are calculated in advance. It is in this way possible in particular to reduce demands on the real-time computing power and to increase the inspectability.

In response to the incoming planning request there is preferably an extensive preplanning, which is transferred to a database in the aerial vehicle and can be used during the flight for reducing the planning problem to a problem of purely deciding on the flight path in the database that is most suitable in each case.

A corresponding configuration of the method according to the invention therefore provides that, in the case of an incoming planning request, preplanning takes place, preferably on a ground-based computing system, which preplanning is preferably transferred to a database in the aerial vehicle, which database comprises a flight path database (with flight paths stored in it) and also a maneuvers database (with maneuvers stored in it) and can be used or is used during a flight to reduce the planning to a purely decision-making problem, in which the most suitable flight path in the database is selected in each case. This reduces the required computing power further and improves the inspectability.

If events or emergency situations that the pre-planned database does not cover occur, this preferably activates an on-line planning algorithm which, on the basis of the likewise precalculated maneuvers database, restores a safe flying state that is provided in the database.

A corresponding configuration of the method according to the invention therefore provides that, in the case of events or emergency situations that the pre-planned database does not cover, which are therefore not recorded by the stored preplanning, this activates an on-line/real-time planning algorithm which, on the basis of the precalculated maneuvers database, restores a safe flying state that is provided in the database by corresponding activation of the aerial vehicle. In other words: the precalculated maneuvers are used to achieve the intended flying state.

The actual mission planning is preceded by the already described pre-processing of data relevant to the aerial vehicle and the environment. This takes place on the assumption of a largely controlled environment in the normal operation of the aerial vehicle. For the path planning of operational states that are not critical to safety (nominal and contingency), the planning of the altitude profile of the flight path is decoupled from the planning in the horizontal direction or plane, as described in DE 10 2020 105 793.8 originating from the applicant. Different two-dimensional planning approaches are used on the pre-planned altitude profile in accordance with its intended application. In the nominal case, these may be for example graph-based approaches with temporal staggering of the flight movements that maximize the operational safety and cost effectiveness.

A corresponding configuration of the method according to the invention therefore provides that, for the planning of operational states that are not critical to safety, so-called nominal and contingency states, planning of an altitude profile of a flight path takes place decoupled from planning in the horizontal plane, as described in particular in DE 10 2020 105 793.8 of Apr. 4, 2020, to which reference is made in full. In this case, different two-dimensional planning approaches may preferably be used application-specifically on the pre-planned altitude profile, in the nominal case for example graph-based approaches with temporal staggering of the flight movements, which may serve for maximizing operational safety and cost effectiveness.

In the case of an unplanned event (so-called contingency case), the provision of as many safe reaction possibilities as possible is at the forefront of the objective functional, in particular the on-line planning algorithm. A phased model is preferably implemented: only when the tree structure of the database has been exhausted does an on-line approach come into effect. This is only used within a precalculated volume and has the aim of guiding the aerial vehicle (back) to a valid database trajectory, from where once again first the tree structure is searched through before a new on-line planning phase is initiated. In this case, different planning approaches are therefore implemented in parallel for different contingency scenarios in an advantageous way. In a corresponding application, the contingency planning is accordingly divided into a preplanning approach and an on-line planning approach, as described in DE 10 2020 126 689.8 originating from the applicant, whereby an additional graduation of the risk to be entered into is performed.

A corresponding configuration of the method according to the invention therefore provides that, in the case of an unplanned event (contingency case), provision of preferably a number of safe reaction possibilities takes place, wherein most preferably different planning approaches are implemented in parallel for different contingency scenarios, wherein in particular the contingency planning is divided into a preplanning approach and an on-line planning approach. This is described in DE 10 2020 126 689.8 of Oct. 12, 2020, to which reference is made in full. Consequently, an additional graduation of the risk to be entered into can be achieved.

Another implementation of the contingency planning that is also possible in the present case is described in DE 10 2019 103 173 A1, which is incorporated herein by reference as if fully set forth.

Alternate routes for less critical events may consequently already be taken into account in the preplanning and be stored with the nominal paths in a trajectories database (flight path database). Planning modules that cover flight phases across operational states can preferably also be used over operational states. In the most relevant applications, this applies in particular to the flight phases of takeoff and landing, and also to the final approach to a landing site.

Corresponding configurations of the method according to the invention therefore provide that the contingency planning—in particular according to DE 10 2019 103 173 A1—takes place in such a way that alternate routes for less critical events are already taken into account in the preplanning and are stored with the nominal paths in a trajectories database, and that in addition or as an alternative planning modules that cover flight phases across operational states are used over operational states.

Nominal and contingency planners, i.e. corresponding algorithms within the control unit, are preferably designed such that all states within the regulatory framework that is relevant to operational flight are covered by them (here SC-VTOL, or EASA Certified). “Genuine” emergencies that decisively impair the flying safety or maneuverability of the aerial vehicle and are outside the regulatorily admissible range are preferably taken into account in a separate planning approach, which has the task of restoring a safe operational state or, if required, ending the mission with minimal damage or injury to the aerial vehicle and persons involved. Comfort, efficiency or business-management considerations do not play a role here, or only a subordinate role. The detection of such emergencies preferably takes place both by means of active sensors on board and also by way of the ground station.

A corresponding configuration of the method according to the invention therefore provides that emergencies that decisively impair the flying safety or maneuverability of the aerial vehicle and/or are outside a regulatorily admissible range are taken into account in a separate planning approach (separate planning methodology), which has the task of restoring a safe operational state or, if required, ending the mission with minimal damage or injury to the aerial vehicle and persons involved.

Such a separate planning approach or algorithm is preferably implemented as an on-line-planning algorithm, in order to be able to react to a greatest possible set of circumstances and events. It is advantageous to reduce the time required for the calculation of a valid solution by maneuvering calculations calculated before departure, in order to ensure short reaction times. Furthermore, in this way possibly existing restrictions of the maneuverability can be taken into account by simply excluding the maneuvers concerned from the planning space.

A corresponding configuration of the method according to the invention therefore provides that a corresponding algorithm is performed as an emergency planning algorithm for on-line planning, wherein associated emergency maneuver calculations are preferably carried out before takeoff and stored in the database. Thus, short reaction times can be ensured.

Another corresponding configuration of the method according to the invention provides that existing restrictions of the maneuverability of the aerial vehicle are taken into account by excluding the emergency maneuvers concerned from the planning space.

In a development of the method, it is appropriate to couple the emergency planning algorithm with a function for the real-time perception of the environment (SLAM—simultaneous localization and mapping), since the assumption made for the preplanning of a largely controlled (known) environment is possibly no longer correct in an emergency.

A corresponding configuration of the method according to the invention therefore provides that the emergency planning algorithm is coupled with a function for the real-time perception of the environment (SLAM).

A decision logic situated at mission level preferably classifies the respective flying state during the flight on the basis of information provided for example to a runtime monitoring system (which as such is not part of the present invention) and selects a planning approach suitable for the situation.

A corresponding configuration of the method according to the invention therefore provides that, during the flight, a decision logic classifies a flying state on the basis of physical information about the aerial vehicle and/or its environment provided in particular to a runtime monitoring system and selects a planning methodology suitable for the current flying state.

In an extensive pre-calculating phase, on the assumption of an operating environment (for example in a metropolitan region) that is largely known and subject to sufficiently slow changing processes, the nominal planning and also large parts of the contingency planning may be carried out before departure and transferred to the (inspectable and validatable) trajectories database. In parallel, a maneuver library specifically designed for the aerial vehicle and an associated maneuver machine are generated and are likewise stored in a database. Both databases or a common database is/are transferred to the aerial vehicle before departure. During the flight, the already mentioned decision module (decision logic) decides, for example on the basis of sensor data or on the basis of data of the flight safety/U-space services or the ground control station, whether there is an emergency requiring intervention of the emergency on-line planning algorithm. If this is not the case, the global path planning problem can be reduced to a logic problem, which simply selects the most suitable trajectory from the trajectories database. As long as a suitable branching point along the flight path can be reached, events/conflicts that are not critical to safety are resolved as contingencies, likewise at the logic level, by diverting to a conflict-free trajectory. If a change between pre-planned trajectories is required between branching points, this can be carried out within likewise predefined zones by means of a contingency on-line planner.

A corresponding configuration of the method according to the invention therefore provides that, as long as a suitable branching point between different trajectories along a preferably precalculated flight path can be reached, events or conflicts that are not critical to safety are resolved, at the logic level, by diverting to a conflict-free, preferably likewise precalculated trajectory by a change of trajectory at the branching point, wherein preferably, in the case of a required change between pre-planned trajectories outside branching points, this change is carried out within predefined geographical zones by means of a real-time contingency on-line planning algorithm. This function can always be initiated if an originally planned trajectory either can no longer be flown or a different trajectory proves to be more suitable for satisfying the objective functional due to a change of external circumstances.

BRIEF DESCRIPTION OF THE DRAWINGS

Further properties and advantages become apparent from the following description of exemplary embodiments with reference to the drawing.

DETAILED DESCRIPTION

Figure 1:
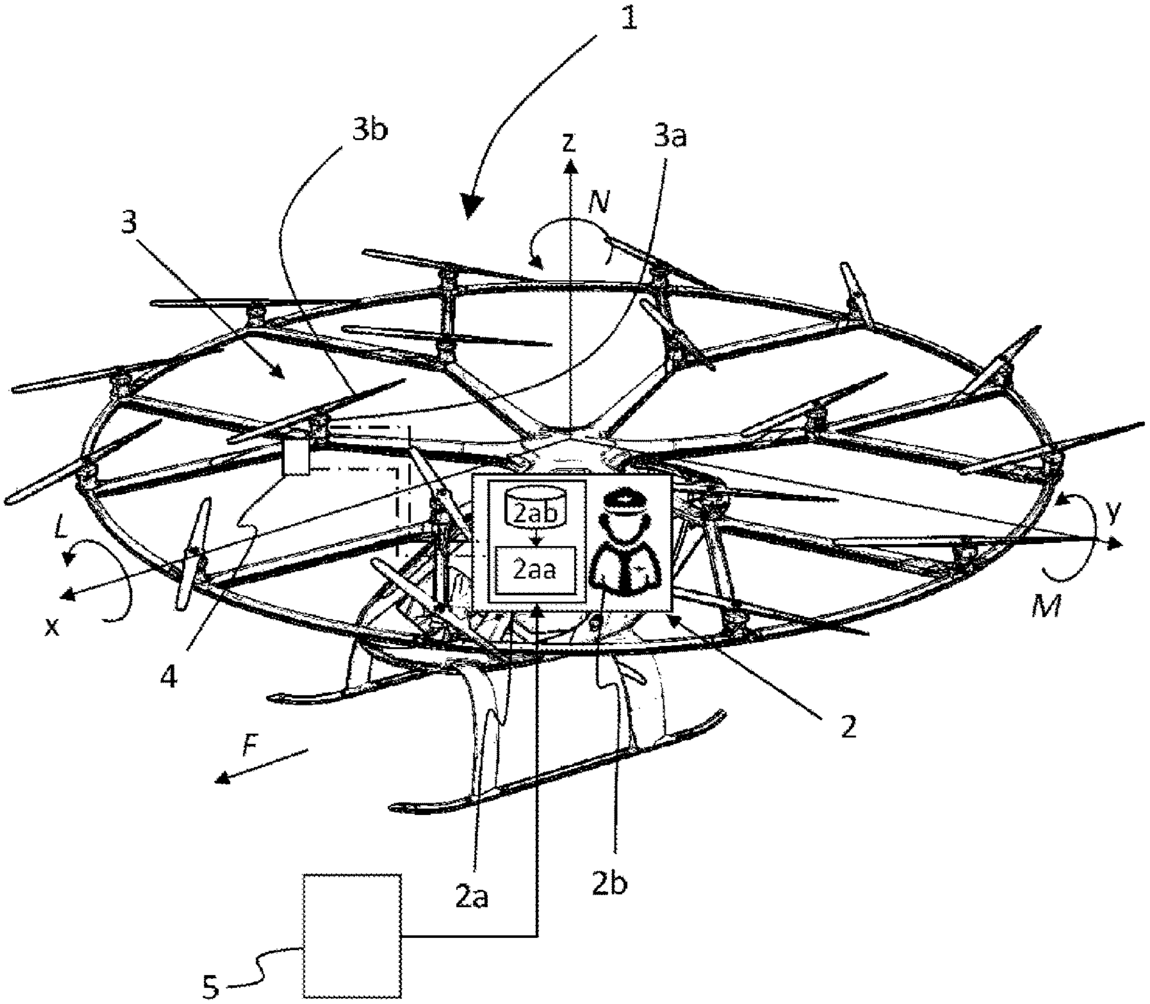
FIG. 1 shows a possible configuration of the aerial vehicle according to the invention.

FIG. 1 shows an aerial vehicle 1 according to the invention in the form of a multicopter with 18 drive units (actuators). In FIG. 1, L, M and N denote the moments about the axes x, y and z (rolling axis, pitching axis and yawing axis) of the aerial vehicle 1, and F denotes the overall thrust. Reference sign 2 symbolizes the (main) flight control of the aerial vehicle 1, which preferably has at reference sign **2*a* a control unit (computing unit) according to the invention and required control and planning algorithms 2*aa* and also a database 2*ab* and generally is configured for carrying out the method according to the invention and its developments, in particular by using software. Additionally shown at reference sign 2*b* is a human pilot, which is not of any further note in the present case. Reference sign 3 denotes one of the 18 (unrestrictedly identical) drive units or actuators, in each case comprising an (electric) motor 3*a* and a rotor 3*b*. Reference sign 4 denotes by way of example a sensor unit operatively connected to the main flight control unit 2 or the control unit 2***a*, in order in a development of the method according to the invention to be able to take into account the available states of the aerial vehicle and environmental conditions by means of sensors. Although not shown, a multiplicity of such sensor units 4 may be provided, in particular inertial measuring units, GNSS, barometers, vibration sensors at the actuators, temperature sensors at the actuators, and the like. Reference sign 5 symbolizes a further computing unit (data pre-processing unit), which is not on board the aerial vehicle 1 but is stationed on the ground. Preferably taking place on this ground-based computing unit 5 is the preplanning further explained in detail above, the results of which are subsequently transferred to the control unit 2*a* of the aerial vehicle 1 and are stored there in the database 2*ab*. Although only one database 2*ab* is shown in FIG. 1, there may also be a number of databases, or the database 2*ab* may be divided into a number of databases, in particular the trajectories database mentioned further above and the maneuvers database likewise mentioned further above.

However, the invention is not in any way restricted to the presence of a ground-based computing unit 5. It goes without saying that all of the planning operations, that is to say also the preplanning, can be carried out on board the aerial vehicle 1, as long as it has sufficient computing power. As a person skilled in the art appreciates, the planning operations may also be divided as desired between the ground-based computing unit 5 and the control unit (computing unit) 2*a* of the aerial vehicle 1.

Figure 2:
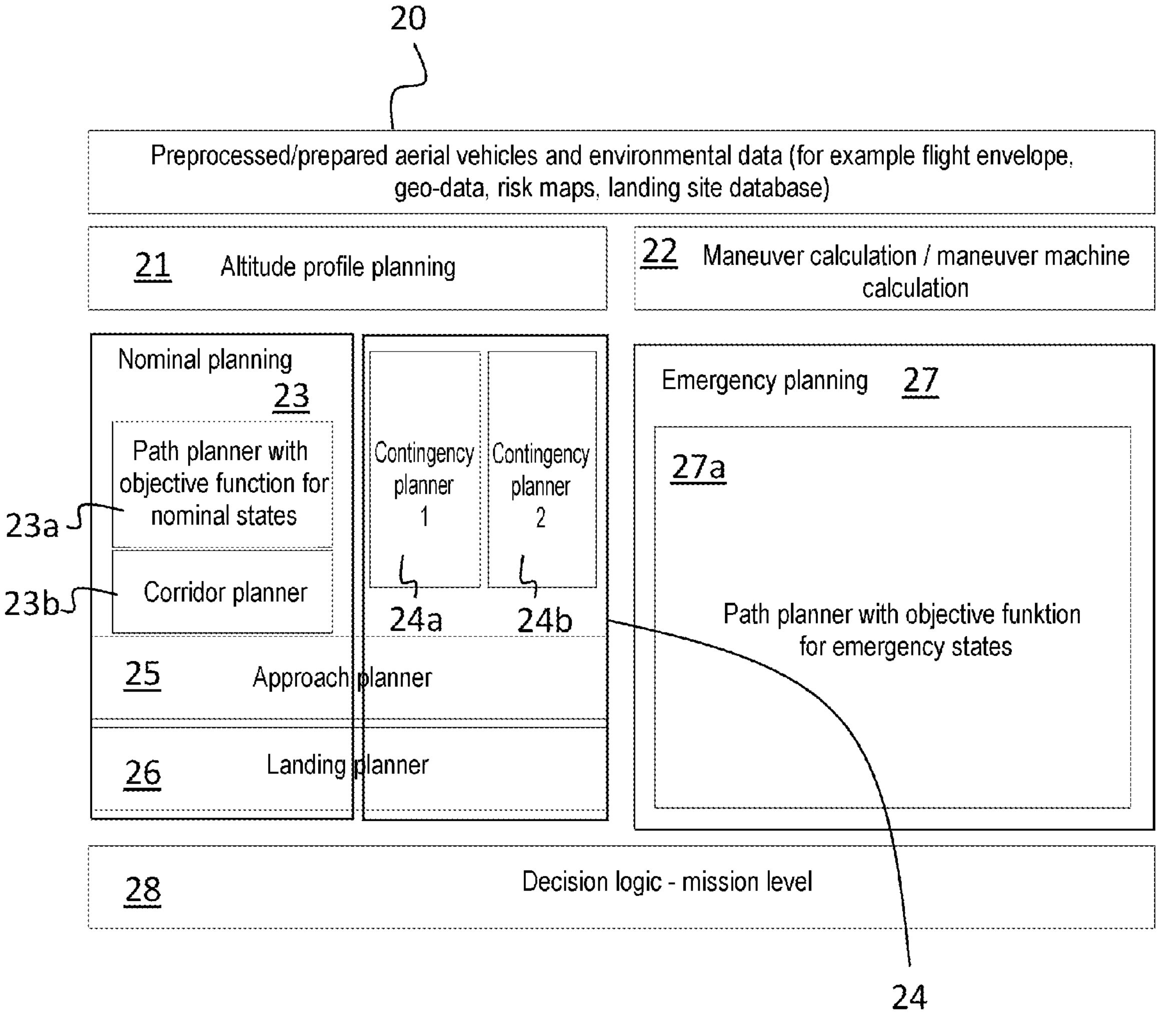
FIG. 2 shows a concept of a mission planning architecture, such as on which a method according to the invention may be based.

FIG. 2 shows on a conceptual level the division of the multi-dimensional planning space into separate planning approaches for operational states and flight phases and also the higher-level planning process, as it can be performed in the course of the method according to the invention. This is shown in the form of a conceptual mission planning architecture, in which, depending on an operational state of the aerial vehicle and a flight phase, different path planning methods are used in order to produce at any time a planning solution adequate for the situation. The mission planning architecture referred to is preferably formed by software within the control unit 2*a* (compare FIG. 1) (denoted in FIG. 1 as a whole by the reference sign 2*aa*).

Shown at reference sign 20 in FIG. 2 are preprocessed and prepared aerial-vehicle and environmental data, which may for example and without restriction comprise for example a flight envelope, geo-data, risk maps or a landing site database. Reference sign 21 denotes the altitude profile planning referred to further above, while reference sign 22 stands for the maneuver calculation or maneuver machine calculation. Preferably, according to reference sign 20, the data are included in the altitude profile planning 21 and the maneuver calculation 22. In particular, the maneuvers calculated at reference sign 22 may be stored in the already mentioned maneuvers database.

Reference sign 23 stands for the nominal planning, while reference sign 24 stands for the contingency planning. The former comprises at reference sign 23*a* a path planner with an objective function for nominal states of the aerial vehicle. The objective function is a function of the parameters of the objective in dependence on one or more input variables. In the nominal case, it is a metric that considers mission risk and energy efficiency. Also comprised at reference sign 23*b* is a so-called corridor planner, which implements an operating concept for the bidirectional use of a flight path identified in advance in the nominal planning. For this, "travel paths" separated horizontally and vertically from one another, on which aerial vehicles can fly in opposite directions at a safe distance, are generated on the basis of the original flight path. The flying altitude is adapted in accordance with existing air traffic rules. Any difference in altitude there may be is bridged by means of helix maneuvers. The contingency planning 24 comprises at reference sign 24*a* a first path planner ("contingency planner 1") with an objective function for contingency states. Furthermore, it comprises at reference sign 24*b* a second path planner ("contingency planner 2") with an objective function for contingency states. Reference signs 24*a* and 24*b* denote in the specific case the contingency off-line planner (24*a*) and the on-line planner (24*b*), as already explained further above. A precondition is the preplanning of a database with contingency flight paths in a tree structure. On each trajectory, paths to all available alternate landing sites are planned at constant time intervals. This call takes place as long as the still remaining time interval until landing is less than that of the planner call (new planning interval), or until another termination criterion (for example coverage) is reached. The exact planning approach for calculating the database is of secondary concern, as long as the database can be validated before departure. A planning solution must be verifiable and validatable by the competent authorities before departure. This arises from the requirements for precalculated flight paths in accordance with SC-VTOL. In the specific case, this means that the planning approach is of secondary concern as long as the planning solution before departure is in a format that can be checked for correctness and conformity with the rules either by machine or by a person.

In this context, so-called wavefront algorithms can be used, by means of which navigation functions can be calculated for a number of parameters of an objective. Also implemented in particular are navigation functions, which minimize the distance traveled, energy requirement and flying time. In accordance with the approach of dividing a large planning problem into many small problems, the number of planners is however not restricted here in principle to these two and can be extended to further sub-problem-specific planners, which is likely to happen in practice.

Reference sign 25 denotes an approach planner, which is specifically designed for the calculation of approach trajectories. Here, different approach directions to a vertiport (landing site) are precalculated, and may be selected according to the wind and occupancy by other aerial vehicles. Furthermore, reference sign 26 stands for a landing planner, which is specifically designed for the calculation of landing trajectories. As FIG. 2 reveals, the approach planner 25 and the landing planner 26 overlap both with the nominal planning 23 and with the contingency planning 24. This is synonymous to saying that planning modules that cover flight phases across operational states are used over operational states.

Shown at reference sign 27 is an emergency planning, which comprises at reference sign 27*a* a path planner with an objective function for emergency states.

Finally, reference sign 28 stands for the already mentioned decision logic at mission level, which in the normal case is designed to select on the basis of physical states of the aerial vehicle 1 determined by sensors (compare FIG. 1) and its environment between precalculated trajectory components from the database 2*ab* (compare FIG. 1) and to put together from them a flight path that is optimum currently under specific criteria.

As already stated further above, in response to an incoming planning request there is initially extensive preplanning, which is transferred to the database in the aerial vehicle and can be used during the flight to reduce the planning problem to a problem of purely deciding on the flight path in the database that is most suitable in each case (decision logic 28). If events or emergency situations that the pre-planned database does not cover occur, this activates an on-line planning algorithm, which, on the basis of the likewise precalculated maneuvers database, restores a safe flying state that is provided in the database by using the maneuvers contained in the maneuvers database (in the form of corresponding control commands) to activate the aerial vehicle, or in particular its drive units, correspondingly.

The algorithm used within the framework of the emergency planning 27 (path planner 27*a*) is preferably the same that is also used in the contingency case. However, in the contingency case the on-line planner plans within precalculated spaces and only between two pre-planned trajectories. In an emergency, less stringent constraints apply, and the on-line planner is used to calculate at the flying time an emergency landing trajectory to a landing site likewise identified at the flying time. In a possible specific case, the same function call is used in the contingency planner 24*b* and in the emergency planner 27*a*.

Figure 3:
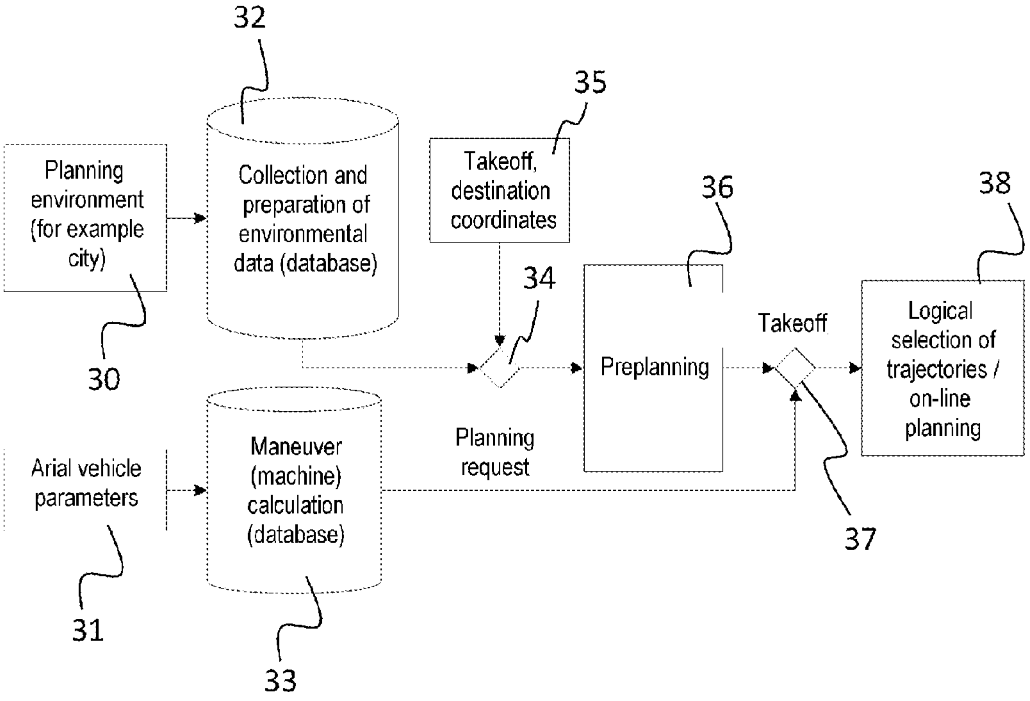
FIG. 3 shows a flow diagram of the mission planning process within the framework of a method according to the invention.

FIG. 3 shows a macroscopic flow diagram of the mission planning process. Data records concerning the aerial vehicle and its environment are prepared and already provide a database for the planning process before a planning request for a specific mission comes in. Extensive preplanning reduces the computing effort (on board the aerial vehicle) during operational flight.

Reference sign 30 stands for a planning environment, for example a city, and the associated environmental data. Reference sign 31 stands for aerial vehicle parameters or for data concerning the aerial vehicle. The environmental data 30 are collected or stored in an associated database 32, possibly after prior preparation. After corresponding calculation, the aerial vehicle parameters 31 lead to the already repeatedly mentioned maneuvers, which are likewise stored in a database 33. If a planning request 34 then takes place on the basis of corresponding takeoff and destination coordinates 35, the already repeatedly mentioned preplanning takes place at reference sign 36. Subsequently, takeoff 37 takes place, after which the precalculated maneuvers from the database 33 are then also included in the further planning. Reference sign 38 stands for the already mentioned logical selection of trajectories or an additional on-line planning, if required.

Reference to these relationships has already been made in detail further above in the general part of the description.

Figure 4:
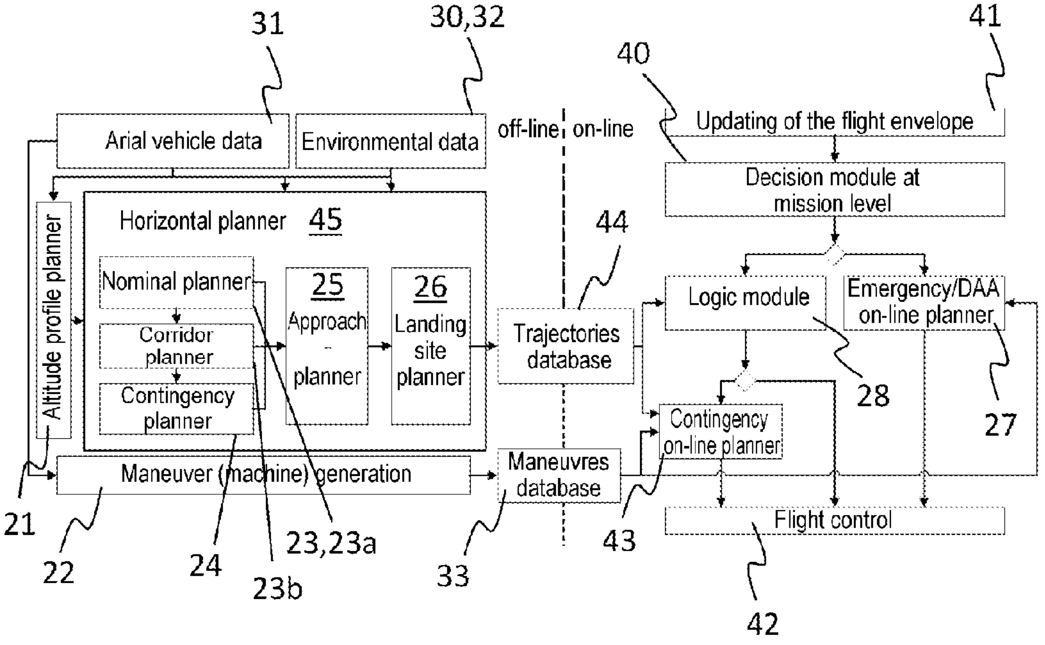
FIG. 4 shows the assignment of planning components depending on the time of execution within the framework of a method according to the invention.

FIG. 4 illustrates the assignment of the individual planning components on the basis of their execution time within the planning process and describes here in particular the division of the path and mission planning process into on-line and off-line components.

It has already been pointed out that in an extensive pre-calculating phase, on the assumption of an operating environment (for example a metropolitan region) that is largely known and subject to sufficiently slow changing processes, the nominal planning and also large parts of the contingency planning (compare FIG. 2) are already carried out before departure and transferred to an (inspectable and validatable) trajectories database. In parallel, a maneuver library specifically designed for the aerial vehicle and associated maneuver machine are generated and are likewise stored in a database (compare FIG. 3). Both databases are transferred to the aerial vehicle before departure (compare database 2*ab* in FIG. 1). During the flight, preferably the decision module mentioned in FIG. 2 (decision logic, logic module 28—preferably a software function) decides whether there is an emergency requiring intervention of the emergency on-line planning algorithm (reference sign 27 in FIG. 2). If this is not the case, the global path planning problem can be reduced to a logic problem, which selects the most suitable trajectory from the trajectories database (reference sign 38 in FIG. 3). As long as a suitable branching point can be reached, events/conflicts that are not critical to safety are resolved as so-called contingencies, likewise at the logic level, by diverting to a conflict-free trajectory. If a change between pre-planned trajectories is required between branching points, this can be carried out within likewise predefined zones by means of a contingency on-line planner 43.

In FIG. 4, the individual components are as far as possible denoted as they have already been denoted previously, in particular in FIGS. 2 and 3. In this case, in particular the landing site planner mentioned in FIG. 4 may correspond to the already mentioned landing planner 26 (FIG. 2). The already mentioned logic module 28 is also preceded at reference sign 40 by a decision module at mission level, which in turn may also be preceded by an updating of the flight envelope at reference sign 41. Depending on how the decision taken at reference sign 40 turns out, either the logic module 28 or the emergency plan 27 comes into action, wherein the results of the latter act directly on the flight controller 42, i.e. are used for activating the units concerned of the aerial vehicle. The logic module 28 is followed by a contingency on-line planner 43, which accesses the trajectories database 44 and the maneuvers database 33, if required. The logic module 28 or the contingency on-line planner 43 also act directly on the flight controller 42, wherein the logic module 28 also accesses the trajectories database 44. As already mentioned, the trajectories database 44 and the maneuvers database 33 may physically take the form of a common database (compare reference sign 2*ab* in FIG. 1).

According to FIG. 4, the nominal planner 23 and also the contingency planner 24 according to FIG. 2, along with their subordinate planning modules, are arranged within a so-called horizontal planner 45, which preferably performs the planning of the flight path in a (horizontal) plane perpendicular to the mentioned altitude profile.

The invention claimed is:

1. A method for planning an operation of an aerial vehicle, said operation being divided into different flight phases each having an individualized planning methodology, the flight phases including at least two of a takeoff phase, a landing phase, a final approach phase, and a corridor phase, each individualized planning methodology being individually validatable and inspectable, the method comprising:

pre-processing data on a ground-located computer basis before takeoff of the aerial vehicle to generate one or more flight paths for each flight phase of the different flight phases, wherein the pre-pre-processing includes preparing available data records and preplanning of a set of flight paths for each flight phase that is as complete as possible of all flight paths relevant during operation;

taking along pre-planned results of the one or more flight paths for each flight phase as a database on board the aerial vehicle;

combining the pre-planned results for the different flight phases using a computer-based decision logic with planning steps at a time of flying in accordance with a state of the aerial vehicle recorded by sensors for generating a current flight path based on the one or more flight paths for the different flight phases; and controlling the aerial vehicle along the current flight path.

2. The method as claimed in claim 1, wherein planning methodologies specifically designed for a respective flight phase are used for all relevant operational states of the aerial vehicle.

3. The method as claimed in claim 1, further comprising, for a planning environment that is known before planning of a specific flight connection, initially generating and making available risk models for the planning in addition to geographical maps, surface models and other environmental data records.

4. The method as claimed in claim 1, further comprising, based on knowledge of physical flying properties of the aerial vehicle, calculating flight paths and maneuvers that are useable in a later course of planning in advance.

5. The method as claimed in claim 1, further comprising, for an incoming planning request, conducting the pre-processing on a ground-based computing system, and transferring the pre-processing of the one or more flight paths for each flight phase to the database in the aerial vehicle, wherein said database comprises a flight path database and also a maneuvers database and is used during flight to reduce planning to a decision-making problem, in which a most suitable flight path in the database is selected in each case.

6. The method as claimed in claim 5, further comprising, for events or emergency situations that the database does not cover, activating an on-line planning algorithm which, based on the maneuvers database, restores a safe flying state that is provided in the database by corresponding activation of the aerial vehicle.

7. The method as claimed in claim 1, further comprising, for planning of flight phases that are not critical to safety, conducting planning of an altitude profile of a flight path decoupled from planning in a horizontal plane utilizing different two-dimensional planning approaches on the altitude profile.

8. The method as claimed in claim 1, further comprising, for an unplanned event, providing a number of safe reaction possibilities using different planning approaches implemented in parallel for different contingency scenarios, with contingency planning being divided into a preplanning approach and an on-line planning approach.

9. The method as claimed in claim 8, wherein the contingency planning takes place such that alternate routes for less critical events are already taken into account in the preplanning and are stored with nominal flight paths in a trajectories database.

10. The method as claimed in claim 1, further comprising utilizing planning modules that cover the different flight phases across operational states.

11. The method as claimed in claim 1, further comprising taking into account emergencies that decisively impair flying safety or maneuverability of the aerial vehicle or are outside a regulatorily admissible range in a separate planning approach that is for restoring a safe operational state or, if required, ending a mission with minimal damage or injury to the aerial vehicle and persons involved.

12. The method as claimed in claim 11, further comprising performing a corresponding algorithm as an emergency planning algorithm for on-line planning, in which associated emergency maneuver calculations are carried out before takeoff and stored in the database.

13. The method as claimed in claim 12, further comprising taking into account existing restrictions of maneuverability of the aerial vehicle by excluding the emergency maneuvers concerned from a planning space.

14. The method as claimed in claim 12, further comprising coupling the emergency planning algorithm with a function for real-time perception of an environment.

15. The method as claimed in claim 1, further comprising, during the flight, classifying a flying state using a decision logic or a decision module based on at least one of physical information about the aerial vehicle or an environment, and selecting a planning methodology suitable for the flying state.

16. The method as claimed in claim 1, further comprising, as long as a suitable branching point between different trajectories along a flight path can be reached, resolving events or conflicts that are not critical to safety at a logic level, by diverting to a conflict-free trajectory by a change of trajectory at the branching point, and for a required change between pre-planned trajectories outside branching points, carrying out the change within predefined geographical zones using a real-time contingency on-line planning algorithm.

17. A control unit for an aerial vehicle, for operating and controlling the aerial vehicle, which operation is divided into different flight phases each having an individualized planning methodology, the flight phases including at least two of a takeoff phase, a landing phase, a final approach phase, and a corridor phase, said planning methodologies being individually validatable and inspectable, the control unit comprising:

a computer-based data pre-processing unit that is at least one of ground-based or on board the aerial vehicle that is configured to pre-process data on a ground-located computer basis before takeoff of the aerial vehicle to generate one or more flight paths for each flight phase of the different flight phases, wherein the pre-pre-processing includes preparing available data records and preplanning of a set of flight paths for each flight phase that is as complete as possible of all flight paths relevant during operation;

a database, which is taken along on board the aerial vehicle, that includes pre-planned results of the data pre-processing unit as the one or more flight paths for each flight phase are stored;

a computer-based decision logic on board the aerial vehicle configured for:

combining the pre-planned results of the one or more flight paths for each flight phase from the database using the decision logic;

carrying out additional planning steps at a time of flying in accordance with a measured state of the aerial vehicle; and generating a current flight path based on the one or more flight paths for the different flight phases; and a controller in operative connection with the decision logic for controlling the aerial vehicle along the current flight path.

18. An aerial vehicle, comprising a control unit as claimed in claim 17.

19. The aerial vehicle according to claim 18, wherein the aerial vehicle is an eVTOL.

20. The aerial vehicle according to claim 18, wherein planning methodologies specifically designed for a respective flight phase are used for each relevant operation state of the aerial vehicle.

* * * * *